(12) United States Patent
Akinpelu et al.

(10) Patent No.: US 6,754,175 B1
(45) Date of Patent: Jun. 22, 2004

(54) HITLESS METHOD AND APPARATUS FOR UPGRADING A NETWORK

(75) Inventors: Akinwale Ademola Akinpelu, Leonardo, NJ (US); Joseph Craig, Middletown, NJ (US); Ronald F. D'Apuzzo, Toms River, NJ (US); Arshad Hussain, Scotch Plains, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/559,518

(22) Filed: Apr. 27, 2000

(51) Int. Cl.[7] .................. G01R 31/08; H04L 12/28; H04L 12/50
(52) U.S. Cl. .............. 370/228; 370/254; 370/386; 340/2.28; 709/249
(58) Field of Search ............................. 370/221, 222, 370/223, 224, 225, 228, 257, 258, 401, 402, 403, 404, 405, 406, 219, 251, 254, 395.1, 227, 218, 356, 386; 340/2.28; 709/249

(56) References Cited

U.S. PATENT DOCUMENTS

| | | | | |
|---|---|---|---|---|
| 5,521,909 A | * | 5/1996 | Holloway et al. | 370/404 |
| 6,442,132 B1 | * | 8/2002 | Burns et al. | 370/218 |
| 6,452,931 B1 | * | 9/2002 | Norman, Jr. | 370/405 |

* cited by examiner

Primary Examiner—Duc Ho

(57) ABSTRACT

This invention provides for a system and method for upgrading an ATM network to a new release of a vendor's ATM platform, or for converting an ATM network to a different vendor's ATM platform, preferably without experiencing any service disruptions. The system and method upgrade involves first reorganizing an existing redundant-based ATM network by splitting the links, for example, fiber links, within the existing redundant-based ATM network among two parallel networks, Network A and Network B. Network A can be changed at this stage. Then the circuits from Network B are moved to Network A by using Bridge and Roll techniques. This hitless procedure allows for the migration of the customer traffic from Network B to Network A without customer traffic disruptions.

20 Claims, 5 Drawing Sheets

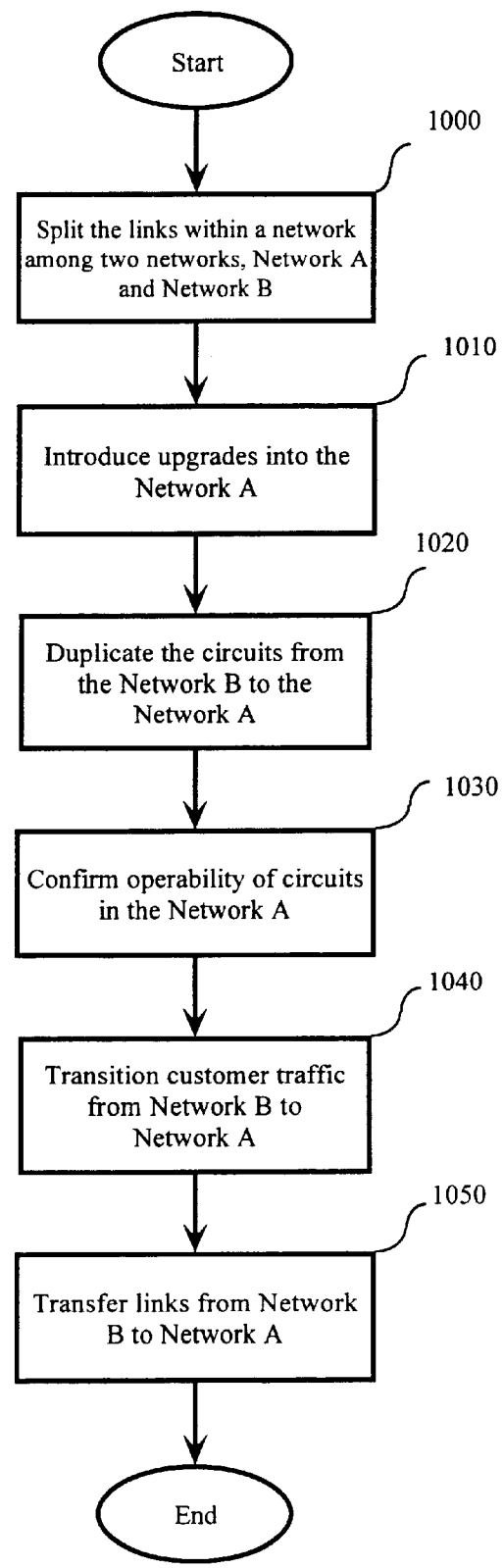

HITLESS METHOD AND APPARATUS FOR UPGRADING A NETWORK

BACKGROUND OF THE INVENTION

1. Field of Invention

This invention relates to a hitless migration method and apparatus for upgrading an ATM network.

2. Description of Related Art

Currently, telecommunications carriers and service providers widely use Asynchronous Transfer Mode (ATM) technology in their networks. Due to the. ATM widely installed base and the continued evolution of this technology, ATM networks often need to be upgraded as new features or in some cases standard-based implementations become available. However, in many cases these upgrades can result in service disruptions, e.g., service hits in the network. For example, a customer can experience downtime and service outages, e.g., for minutes or even hours, during a typical ATM network upgrade. The typical practice is to interrupt/takedown service during an upgrade. For instance, in private line service, customer downtime can be a big issue, costing a customer and a service provider a large sum of money.

One reason for migrating to a new network can be a service-affecting upgrade of an existing switch network. Another reason can be replacing an existing switch with a new switch to obtain better performance or price. For example, a current vendor might not support the desired features or interfaces, or the current switch can not be scaled up to the newly required performance and capacity.

Due to the explosive growth in the demand in data services, the number of customers and the amount of bandwidth that customers require, there will inevitably be a need to scale up current switches to keep up with new performance and capacity requirements. Service providers are faced with the need to do network maintenance and upgrades without adversely impacting the customers.

SUMMARY OF THE INVENTION

This invention provides a system and method for upgrading an ATM network to a new release of a vendor's ATM platform or for converting an ATM network to a different vendor's ATM platform without experiencing any noticeable service disruptions. The system and method of the present invention consists of taking an existing redundant ATM network and reorganizing that network by splitting the redundant links- for example, fiber links- within the existing redundant ATM network among two parallel networks without adding any additional links. For illustrative purposes, these two parallel networks are called Network A and Network B.

Initially, an existing network is ideally setup whereby there are at least two paths for each circuit, e.g., a redundancy setup. The redundant setup allows a system administrator to remove redundant links from Network A to use in Network B. The networks are basically seen as links connecting ATM switches with each other. Upon reorganizing the existing old network into two parallel networks, i.e., Network A and Network B, Network A and Network B will resemble the old existing network without the linkage redundancy, however, Network A may now include an upgrade.

Instead of one network, we will now have two established networks comprising similar links and circuits. The links within each of the two newly established separate networks are non-redundant. One network can be used for upgrading purposes and the other network can be used for continuing uninterrupted service to the customers. Connectivity between the two nodes will be established, for example, by using a SONET ring infrastructure to carry signals between ATM nodes in both networks.

Network A can represent a network in which circuits will be upgraded and Network B can represent a network which is used for continuing service to the customers during the upgrade. In network A, a service-affecting upgrade or a replacement of an existing switch may be required. Network B will be using techniques from the old network architecture. Once all necessary hardware replacements are made in Network A and after a successful hitless upgrade, i.e., a performance objective of no more than 3 short failure events per month, of Network A, the physical links used in Network B can be moved to the newly upgraded ATM Network A.

In other words, circuits are systematically moved from Network B to Network A by preferably using a Bridge and Roll technique. After circuits have been moved and tested, the customer traffic from Network B is migrated to Network A, preferably without experiencing any noticeable customer disruptions. Finally, an upgraded redundant-based ATM network can be established by transferring the links in Network B to Network A.

These and other aspects of the invention will be apparent or obvious from the following description.

BRIEF DESCRIPTION OF THE DRAWINGS

The invention is described in detail with reference to the following figures, wherein like numerals reference like elements, and wherein:

FIG. 5 shows a flowchart of an exemplary process of the hitless migration system.

DETAILED DESCRIPTION OF PREFERRED EMBODIMENTS

The invention is described below in connection with hitless migration of an ATM network. Mail order companies relying on networks to keep track of orders and inventory, car rental companies utilizing centralized databases to keep track of their cars, banking/finance companies utilizing the network for transactions and trading, as well as utilities companies, medical companies, airline companies, government customers, and the like all depend upon a network continual availability and reliability. It will be appreciated that the invention can be used with many types of network systems, including wired and wireless network, computer network, cable networks, satellite networks, Internet networks, corporate networks or other similar networks that require high reliability.

Figure 1:
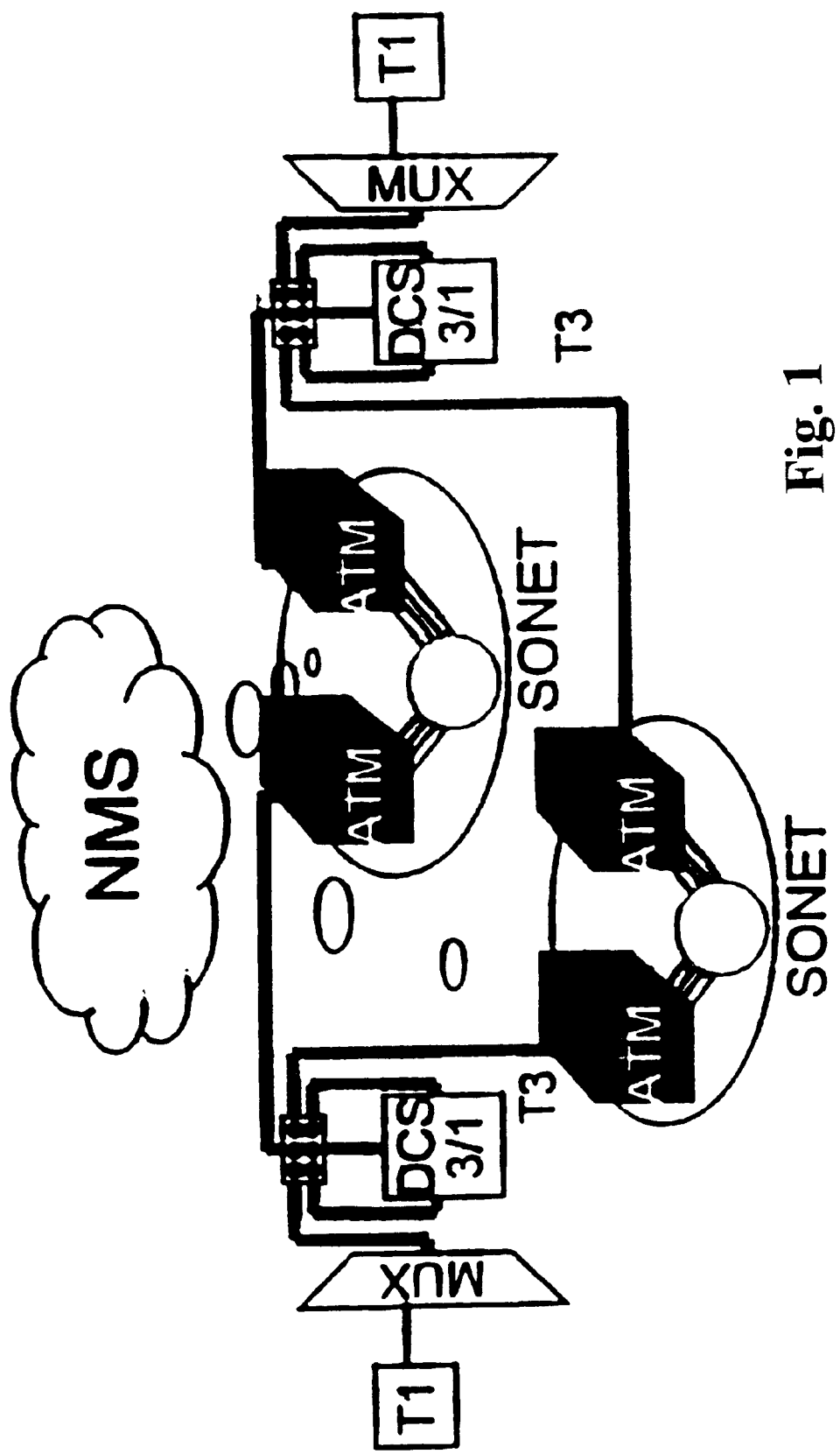
FIG. 1 shows an exemplary diagram for hitless migration from one network to another.

FIG. 1 shows an exemplary diagram for performing a hitless migration from one network to another. The hitless migration system includes a plurality of ATM networks coupled to: digital cross-connect systems capable of performing bridge and roll techniques, transmission infrastructures for carrying signals between ATM nodes in each network, a network management system (NMS), multiplexers (MUX), and customers circuits (T1). While a DCS 3/1 digital cross-connect system can be used, the hitless migration system is not limited to a DCS 3/1 system, similar systems may also be used.

If a DCS 3/1 is used, the DCS 3/1 system can be used to Bridge and Roll a single customer circuit at a time. This can be a one-way or two-way Bridge and Roll. Vendors usually provide the Bridge and Roll capabilities in their time division multiplexer (TDM) digital cross-connect systems. During a DCS 3/1 Bridge and Roll technique, circuits are moved from one network, i.e., Network B to another network, Network A. Bridging refers to when both Network A and Network B are carrying the customer circuit simultaneously. Rolling occurs when the customer circuit is removed from Network B and is preferably only carried on Network A. The customer circuit can be bidirectional, i.e., capable of both transmitting and receiving data. A Bridge and Roll can be done in one direction and then the Bridge and Roll can be done in the opposite direction.

The hitless migration system of the present invention provides for moving from an installed-base network to a upgraded feature-rich network or to a new upgrade of the same network. In other words, the installed-base network can take advantage of new features by taking existing customers from the legacy network to the new network by using the DCS 3/1, for example, to do a Bridge and Roll without any noticeable disruptions to customer traffic.

As a result, the NMS is upgraded first, then the individual customer circuits can be categorized for upgrading next. The NMS preferably acts like a watchdog for the network switches. Any defects or problems with the switches can be detected by the NMS.

Figure 2:
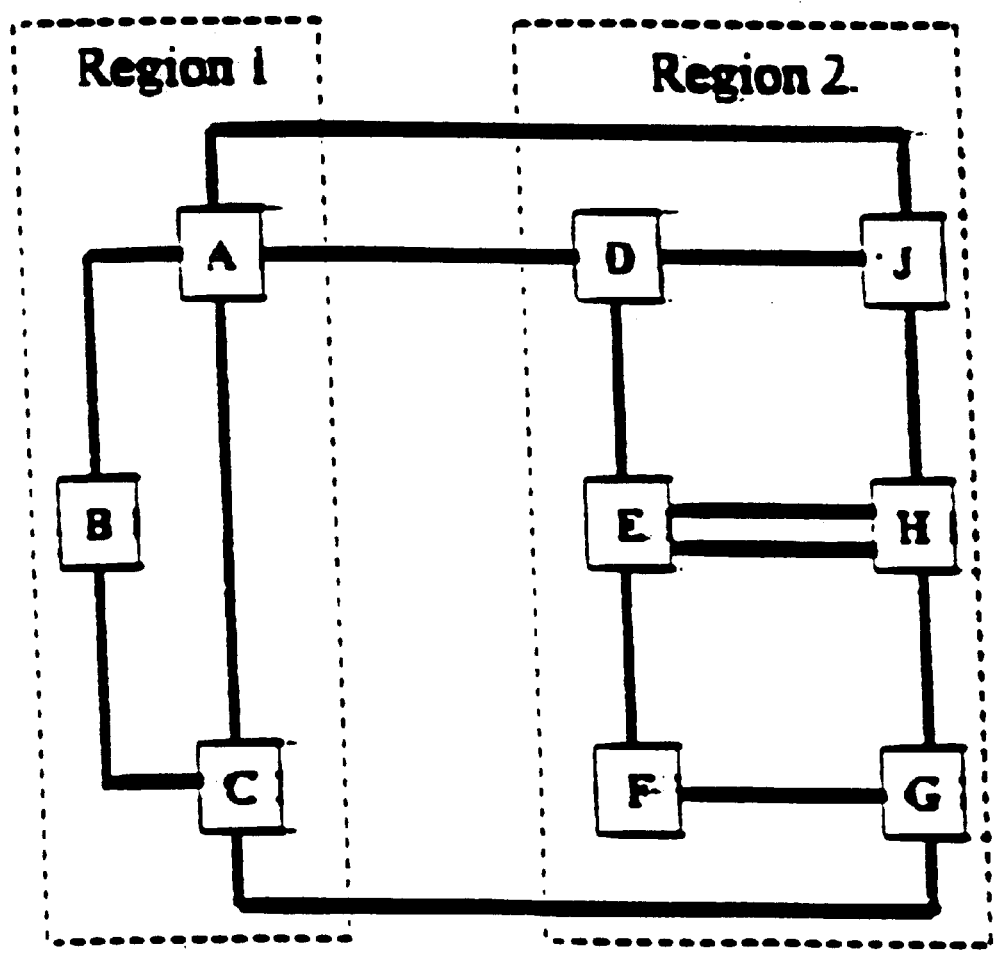
FIG. 2 shows an exemplary diagram of an ATM network comprising two regions.

As seen in FIG. 2, a typical ATM network may be divided between two regions, i.e., for illustrative purposes, region 1 and region 2. Region 1 may be in California whereas region 2 can be in New York. In this example, there are three links between region 1 and region 2. In order to construct two parallel ATM networks from this typical ATM network, the physical links between region 1 and region 2 must be divided to form two parallel networks, without adding any additional links.

It can be assumed that the typical ATM network is designed based on a redundancy system, i.e., more than one path between individual circuits. Given this assumption, the physical links in the typical ATM network can be divided between two parallel networks with each network including at least one of the paths. Once the two parallel networks are established, a vendor's network elements, e.g., ATM switch hardware, and a network management system (NMS) can be upgraded in Network A, while customer traffic continues in Network B.

After network elements are upgraded in Network A, circuits can be transitioned from Network B. In order to transition circuits from one network to another, one-way or two-way Bridge and Roll techniques can be used. Bridge and Roll is a process used to roll circuits between nodes. First, the circuits can be bridged, e.g., run simultaneously on both Network A and Network B. Then, the circuits can be rolled to Network A, e.g., carried only on Network A. After a successful hitless upgrade, the remaining physical links in Network B can be moved to the newly upgraded ATM network, Network A.

A digital cross-connect system (DCS 3/1) can be used to Bridge and Roll a single circuit at a time. In order to conduct a Bridge and Roll between two parallel ATM networks, the actual Bridge and Roll procedure must be carried out outside the ATM boundaries of the two parallel networks. This is because it is impossible to switch the input into the ATM boundaries from one node to another node from inside the initial node. ATM does not currently have Bridge and Roll capability, therefore, an additional ATM node cannot be used for a Bridge and Roll. Vendors normally provide the Bridge and Roll capabilities in their digital cross-connect systems. The Bridge and Roll process can also be automated by writing scripts, for example, to minimize errors.

Once all circuits are transitioned to Network A and fully tested, the links in Network B can be brought over to Network A thereby creating a redundant setup once again. If for any reason there is a problem associated with Network A, this process allows you to return to Network B if the need arises.

Figure 3:
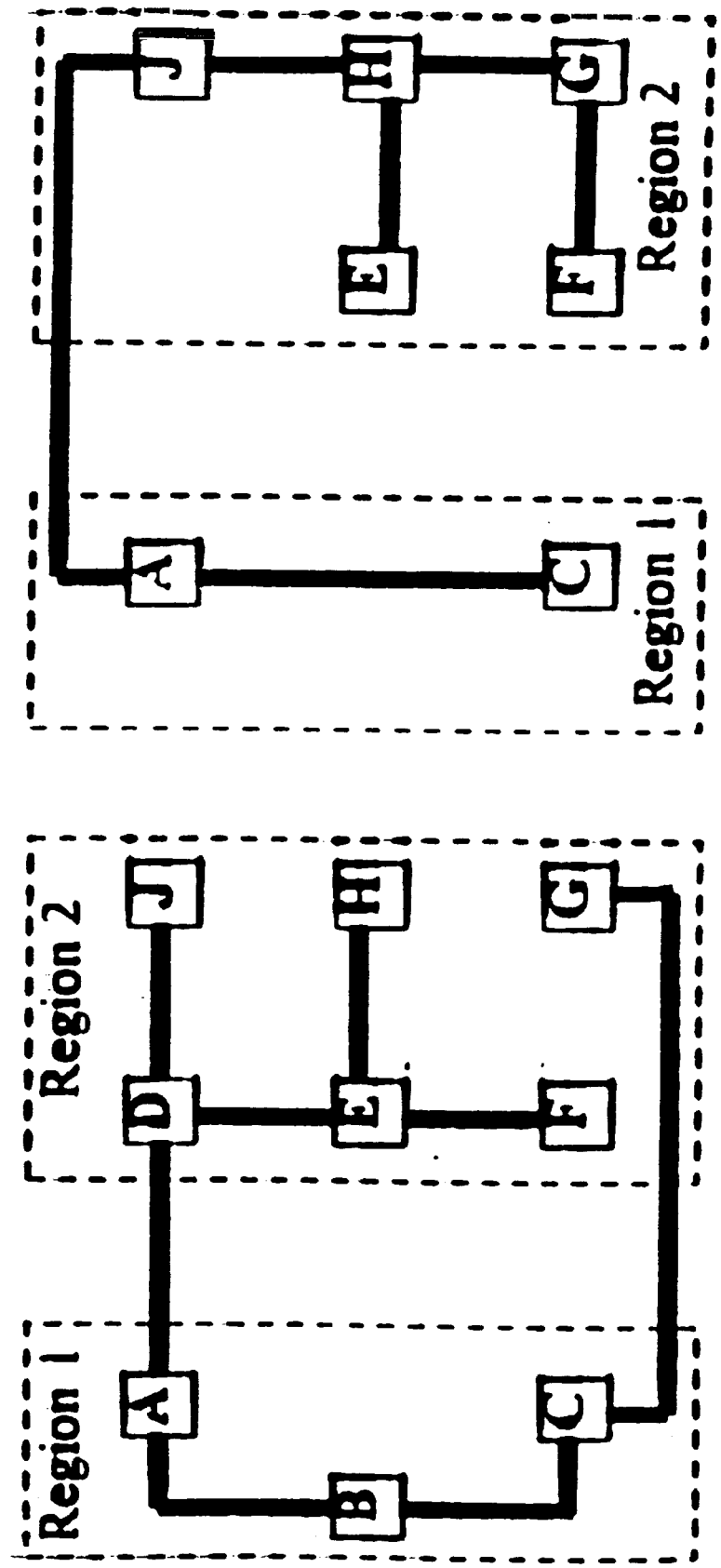
FIG. 3 shows an exemplary diagram for dividing the facilities of FIG. 3 between two parallel networks.

FIG. 3 illustrates three links between region 1 and region 2, e.g., between A and J, between A and D, and between C and G. FIG. 3 also illustrates how there are at least two paths between each customer circuit. For example, to get from circuit A to circuit E, one path would be from A-D-E, whereas a second path could be from A-J-H-E.

By initially having at least two paths between circuits, the present invention enables the existing network to be divided into at least two parallel networks, Network A and Network B, with some links used only in Network A and the other links used only in Network B. For example, link A-D-E could be in Network A and link A-J-H-E could be in Network B. In other words, by preferably using existing network interface cards, links, etc., Network A can be constructed parallel to Network B by removing some of the redundant paths in existing network and using these paths in Network B, thus establishing two networks.

In FIG. 3 an exemplary diagram for dividing the facilities of FIG. 2 between two parallel networks without having to add additional links is shown. For illustrative purposes, the two parallel networks will again be referred to as Network A and Network B. In the existing network of FIG. 2, there are three links between region 1 and region 2. One example of dividing such an existing network into two parallel networks is to have Network A consisting of two links between region 1 and region 2, e.g., A-D and C-G, and have Network B consisting of one link between region 1 and region 2, e.g., A-J. Furthermore, physical links between individual circuits A-J can be divided between the two parallel networks.

When dividing an existing network into two parallel networks, redundancy capacity may become lost in each individual network. For example, in Network A, only one path may exist between A and F, e.g., A-D-E-F. However, this dual non-redundant network setup is a temporary and beneficial situation. The probability of customer disruption due to the loss of redundancy is low compared to the certainty of customer disruption and/or downtime without the procedure.

The amount of downtime due to the upgrade or replacement to a customer circuit without the Bridge and Roll procedure can be estimated as $$D_u = 2T_n + (n-2)/2(T_R)$$

where $D_u$ is the total amount of downtime for a customer circuit due to the upgrade, $T_n$ is the time that a node will not be able to carry a customer circuit due to the upgrade or replacement, n is the average number of nodes a customer circuit passes through and $T_R$ is the time it takes a circuit to restore due to the loss of an intermediate node.

The amount of downtime due to the probability of customer disruption due to a loss of redundancy can be estimated as $$D_{B\&R} = T_{B\&R} + P_n n/N(T_F) + P_L(n-2)T_L$$

where $D_{B\&R}$ is total amount of probable downtime for a customer circuit due to the Bridge and Roll procedure, $T_{B\&R}$ is the time that the customer will be down due to the Bridge and Roll, $P_n$ is the probability of an individual node failure during the time when there is no redundancy in the split networks, n is the average number of nodes a customer circuit passes through, N is the total number of nodes in the network, $T_N$ is the mean time to repair a node, $P_L$ is the probability of an individual physical link failing during the time when there is no redundancy in the split networks and $T_L$ is the mean time to repair a physical link.

If $D_{B\&R}$ is less than $D_u$ then the probable downtime for a customer circuit is less if the Bridge and Roll procedure in accordance with the present invention is used than if a standard upgrade or replacement is performed.

Figure 4:
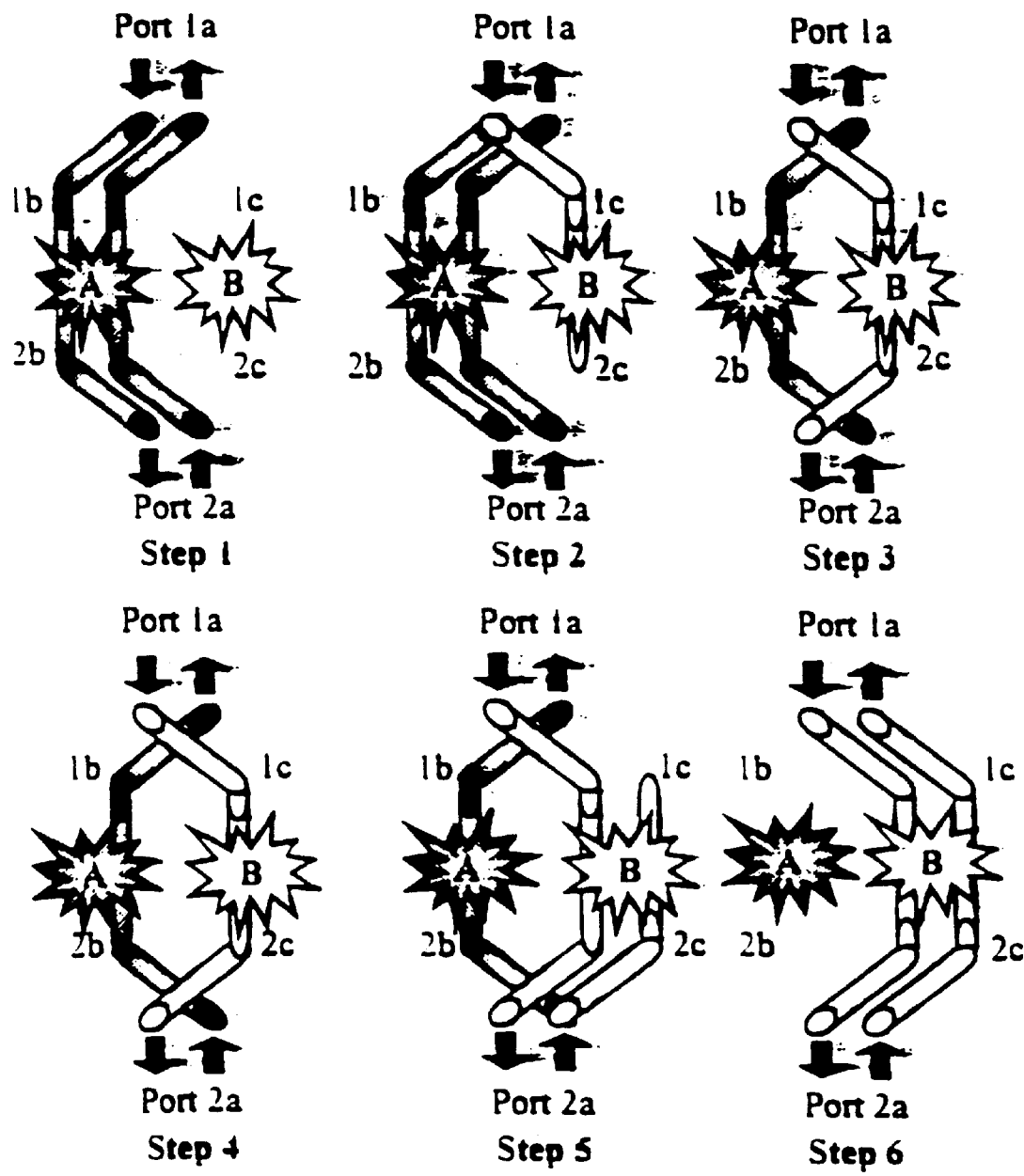
FIG. 4 shows an exemplary Bridge and Roll process.

FIG. 4 shows an exemplary Bridge and Roll six-step process. For illustrative purposes, the migration procedure is from ATM Network A to ATM Network B with a customer circuit being represented by a test circuit. In step 1, the transmit and receive of the test circuit are fed to a DCS 3/1 at port 1*a* and cross-connected to port 1*b*. The circuit appears at port 2*b* of the DCS 3/1. It is then cross-connected to port 2*a*.

In step 2, the transmit side of the test circuit is "Broadcast" and carried simultaneously on Network A and Network B, to port 1*c*. The transmit side of the circuit appears at port 2*c*.

In step 3, a cross-connect is established between port 2*c* and port 2*a* by a "Roll" command, e.g., remove traffic from network A to network B, in the DCS 3/1. The Roll command is also responsible for deleting the original cross-connect between port 2*b* and port, 2*a*. This can be a critical juncture in the Bridge and Roll process. The test circuit is transmitted through one ATM network and received by another ATM network.

The "Roll" can introduce one or two severely errored seconds (SES) onto the test circuit. The data carried in those one or two SESs may be recoverable by higher layer protocols. For some service providers, there is a performance objective not to exceed 3 SFE's per month. An SFE is counted when there are three consecutive SESs. Since this procedure can result in two or less separate occurrences of one or two SESs, this process preferably would not result in an SFE. Hence, the procedure will be "hitless."

In step 4, the process can be monitored from an operations perspective. All network events can be gathered in this step. Here, the test circuit is carried through two different networks, the transmit on Network B and the receive on Network A.

In step 5, the receive side of the test circuit is "Broadcast", carried simultaneously on Network A and Network B, to port 2*c* of the DCS 3/1. The receive side of the test circuit appears at port 1*c*.

In step 6, a cross-connect is established between port 1*c* and port 1*a* by a "Roll" command, e.g., remove traffic from Network A to Network B, in the DCS 3/1. The Roll command is also responsible for deleting the original cross-connect between port 1*b* and port 1*a*.

FIG. 5 shows a flowchart of an exemplary process of the hitless migration system. In step 1000, the system splits the links within an existing network among two parallel networks, Network A and Network B. Both Network A and Network B contain similar physical links, although not necessarily identical to one another, between the different circuits.

In step 1010, upgrades or replacements are introduced into Network A, then the process goes to step 1020. In step 1020, the circuits from Network B, which resembles the old network, are duplicated in the upgraded Network. The circuits can be duplicated in Network A by using the Bridge and Roll techniques explained above. Once the circuits are duplicated in Network A, the process goes to step 1030.

In step 1030, the operability of the circuits in Network A are confirmed. The circuits are tested to make sure that there are no problems. Then the process proceeds to step 1040.

In step 1040, the customer traffic from Network B can be transitioned to Network A. Network A now includes the upgrades and the customer traffic. Then the process goes to step 1050.

At step 1050, the physical links from Network B will be transitioned into Network A, creating a single redundant-based upgraded network.

While the invention has been described in conjunction with specific embodiments thereof, it is evident that many alternatives, modifications and variations will be apparent to those skilled in the art. Accordingly, preferred embodiments of the invention as set forth herein are intended to be illustrative, not limiting. Various changes may be made without departing from the spirit and scope of the invention.

What is claimed is:

1. A method comprising removing, from a first communications network, physical links interconnecting a first plurality of nodes within the first network, using the removed links to interconnect a second plurality of nodes within a second communications network so that the physical links that were in the first network are divided between the first network and the second network;

connecting, to the second network, customer circuits that were connected to the first network, introducing a change in the first network; and reconnecting to the first network at least ones of the customer circuits that were connected to the second network.

2. The method of claim 1 wherein said connecting and said reconnecting are carried out in such a way as to provide continuing uninterrupted service to customers.

3. The method of claim 1 wherein said connecting includes bridging and rolling customer circuits from respective ones of the first plurality of nodes to respective ones of the second plurality of nodes, and said reconnecting includes bridging and rolling customer circuits from respective ones of the second plurality of nodes to respective ones of the first plurality of nodes.

4. The method of claim 3 wherein the bridging and rolling of each customer circuit is performed by a cross-connect connected to that customer circuit and connected to both the first and second networks.

5. The method of claim 1 wherein said introducing a change comprises upgrading the first network.

6. The method of claim 1 wherein the nodes are telecommunications switches.

7. The method of claim 1 further comprising removing at least one of the removed links from the second network subsequent to said reconnecting and using said at least one of the removed links to interconnect nodes in the first network in such a way as to create at least one redundant path within the first network.

8. A method for making changes in a first communications network to which customer circuits are connected via one or more cross-connects, the method comprising:

removing, from the first network, redundant physical links interconnecting nodes within the first network, using the removed links to interconnect nodes within a second communications network so that the physical links that were in the first network are divided between the first network and the second network;

operating one or more of said cross-connects in such a way as to bridge and roll said customer circuits from the first network to the second network, introducing in the first network at least one of a) a change and b) an upgrade; and operating one or more of said cross-connects in such a way as to bridge and roll said customer circuits from the second network back to the first network.

9. The method of claim 8 wherein the nodes are telecommunications switches.

10. The method of claim 9 further comprising removing at least one of the removed links from the second network subsequent to the second said operating and using said at least one of the removed links to interconnect nodes in the first network in such a way as to create at least one redundant path within the first network.

11. A network arrangement created by the method comprising removing, from a first communications network, physical links interconnecting a first plurality of nodes within the first network, using the removed links to interconnect a second plurality of nodes within a second communications network so that the physical links that were in the first network are divided between the first network and the second network;

connecting, to the second network, customer circuits that were connected to the first network, introducing a change in the first network; and reconnecting to the first network at least ones of the customer circuits that were connected to the second network.

12. The network arrangement of claim 11 wherein said connecting and said reconnecting are carried out in such a way as to provide continuing uninterrupted service to customers.

13. The network arrangement of claim 11 wherein said connecting includes bridging and rolling customer circuits from respective ones of the first plurality of nodes to respective ones of the second plurality of nodes, and said reconnecting includes bridging and rolling customer circuits from respective ones of the second plurality of nodes to respective ones of the first plurality of nodes.

14. The network arrangement of claim 13 wherein the bridging and rolling of each customer circuit is performed by a cross-connect connected to that customer circuit and connected to both the first and second networks.

15. The network arrangement of claim 11 wherein said introducing a change comprises upgrading the first network.

16. The network arrangement of claim 11 wherein the nodes are telecommunications switches.

17. The network arrangement of claim 11 wherein said method further comprises removing at least one of the removed links from the second network subsequent to said reconnecting and using said at least one of the removed links to interconnect nodes in the first network in such a way as to create at least one redundant path within the first network.

18. A network arrangement created by a method for making changes in a first communications network to which customer circuits are connected via one or more cross-connects, in which the method comprises:

removing, from the first network, redundant physical links interconnecting nodes within the first network, using the removed links to interconnect nodes within a second communications network so that the physical links that were in the first network are divided between the first network and the second network;

operating one or more of said cross-connects in such a way as to bridge and roll said customer circuits from the first network to the second network, introducing in the first network at least one of a) a change and b) an upgrade; and operating one or more of said cross-connects in such a way as to bridge and roll said customer circuits from the second network back to the first network.

19. The network arrangement of claim 18 wherein the nodes are telecommunications switches.

20. The network arrangement of claim 19 wherein said method further comprises removing at least one of the removed links from the second network subsequent to the second said operating and using said at least one of the removed links to interconnect nodes in the first network in such a way as to create at least one redundant path within the first network.

* * * * *